(12) United States Patent
Eylenbosch et al.

(10) Patent No.: US 7,878,557 B2
(45) Date of Patent: Feb. 1, 2011

(54) KNOTTER FOR A BALER

(75) Inventors: Kris Eylenbosch, Ghent (BE); Marnix J. Schoonheere, Ichtegem (BE)

(73) Assignee: CNH America LLC, New Holland, PA (US)

( * ) Notice: Subject to any disclaimer, the term of this patent is extended or adjusted under 35 U.S.C. 154(b) by 68 days.

(21) Appl. No.: 12/419,941

(22) Filed: Apr. 7, 2009

(65) Prior Publication Data

US 2009/0250930 A1 Oct. 8, 2009

(30) Foreign Application Priority Data

Apr. 8, 2008 (EP) ................................ 08154176

(51) Int. Cl.
B65H 69/04 (2006.01)
(52) U.S. Cl. ................ 289/5; 289/13; 289/16
(58) Field of Classification Search ........... 289/5, 289/13, 16
See application file for complete search history.

(56) References Cited

U.S. PATENT DOCUMENTS

| | | | |
|---|---|---|---|
| 2,815,233 A | | 12/1957 | Collins |
| 3,101,963 A | * | 8/1963 | Sullivan et al. ........... 289/11 |
| 3,400,959 A | * | 9/1968 | Grillot ........................ 289/2 |
| 3,416,825 A | * | 12/1968 | Nolt ........................... 289/13 |
| 3,419,300 A | * | 12/1968 | Nolt et al. .................. 289/13 |
| 3,722,934 A | * | 3/1973 | Nolt et al. .................. 289/13 |
| 4,108,062 A | | 8/1978 | White |
| 4,142,746 A | * | 3/1979 | White ......................... 289/2 |
| 4,223,926 A | * | 9/1980 | Nolt .......................... 289/10 |
| 7,287,782 B2 | * | 10/2007 | Naeyaert ..................... 289/2 |
| 7,296,828 B2 | | 11/2007 | Schoonhere et al. |

* cited by examiner

Primary Examiner—Shaun R Hurley
(74) Attorney, Agent, or Firm—Patrick M. Sheldrake; Michael G. Harms

(57) ABSTRACT

A knotter had a twine holder, a bill hook, an arm carrying a crotch and a cutter and a twine finger operated by a drive mechanism to form two knots consecutively, the first to tie together two runs of twine passed around a completed bale and the second to tie together two runs of twine drawn from respective supply rolls for the commencement of the next bale. The twine holder serves to grip the two runs of twine drawn from the supply rolls throughout the formation of the two knots. The bill hook serves to knot the runs of twine gripped by the holder. The cutter serves to sever the runs of twine between the holder and the bill hook. The crotch pushes the twine runs off the bill hook during the completion of each knot. The twine finger is pivotably mounted on the opposite side of the bill hook from the twine holder to bring the sections of the runs of twine to be knotted within the reach of the bill hook. In the invention, an edge of the twine finger contacting the runs of twine as the knots are pushed off the bill hook by the crotch comprises an obstruction to resist movement of the runs of twine in a direction transverse to their length.

4 Claims, 4 Drawing Sheets

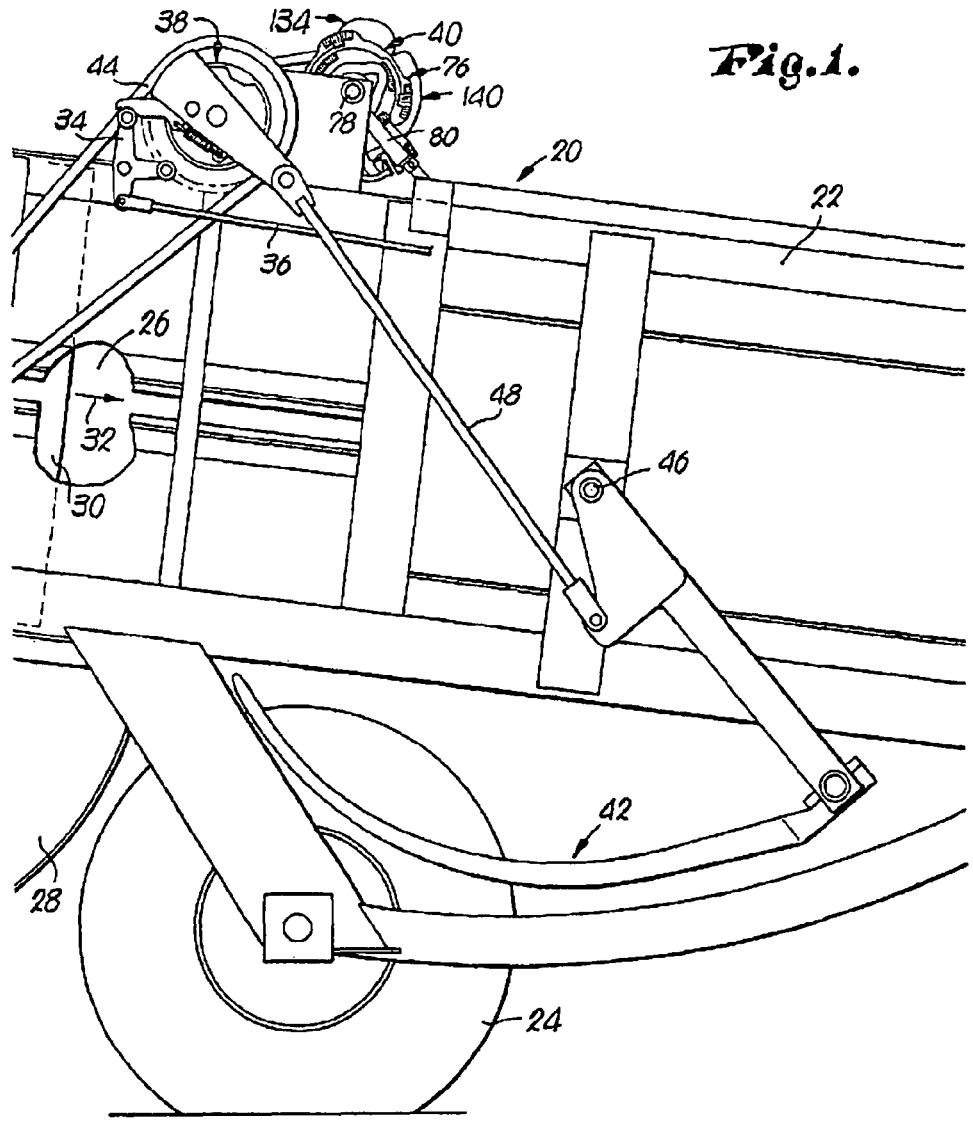
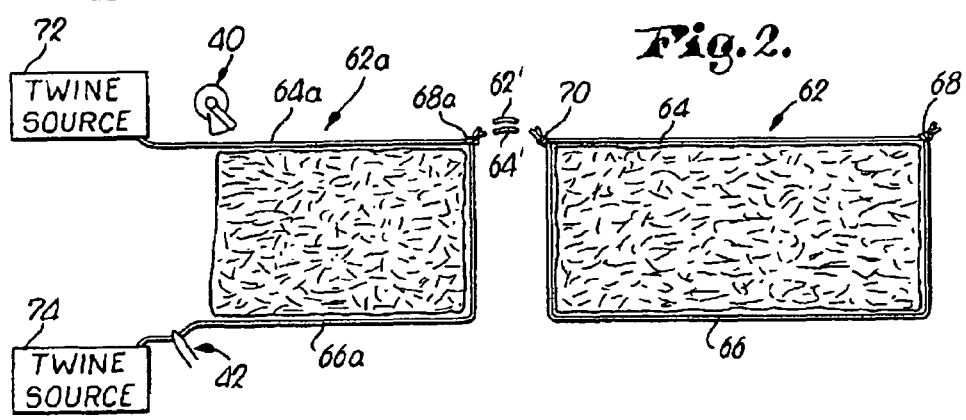

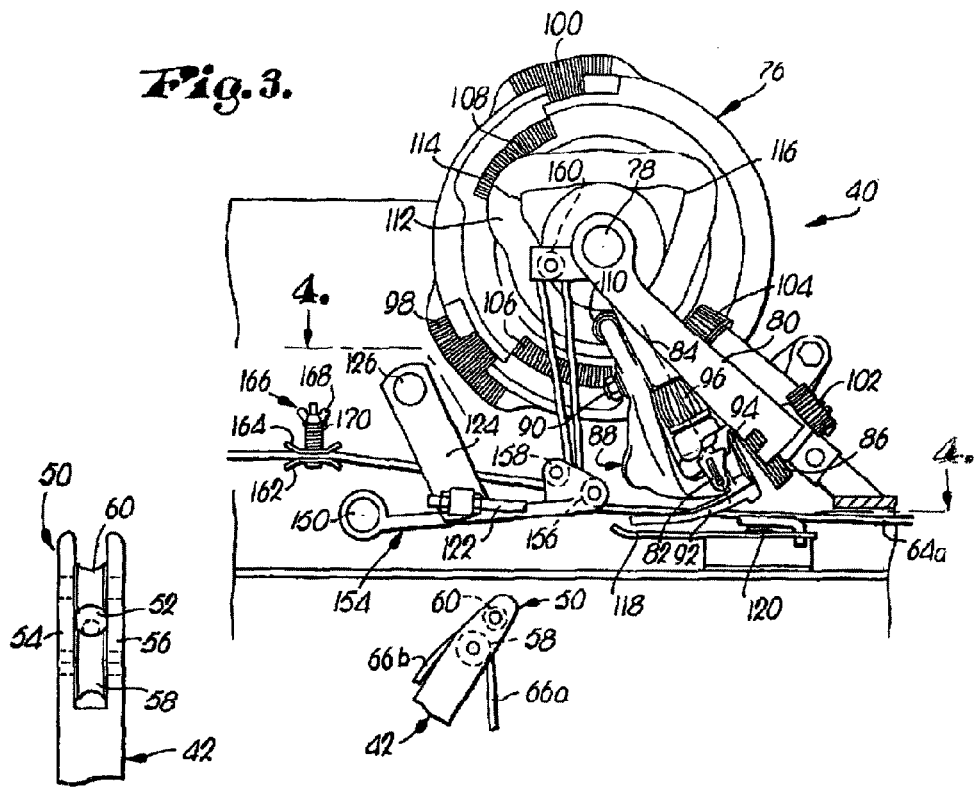
Fig. 3.
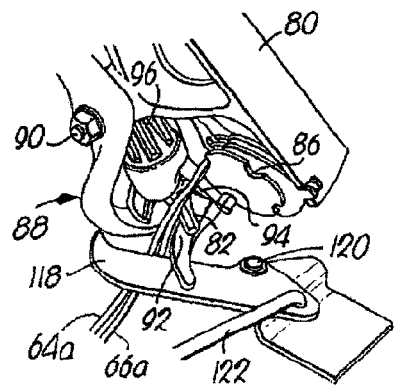
Fig. 17.
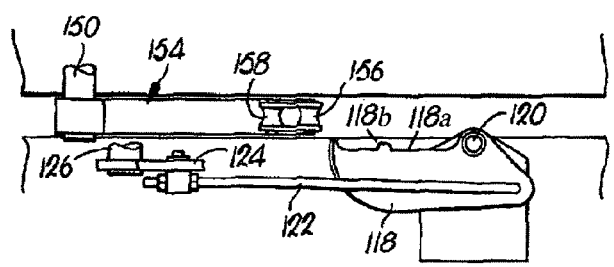
Fig. 4.
Fig. 5.

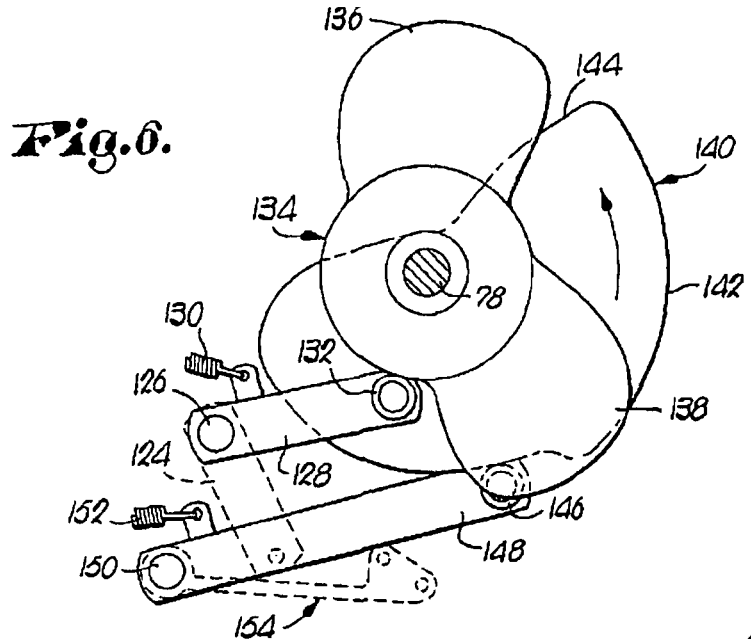
Fig. 6.
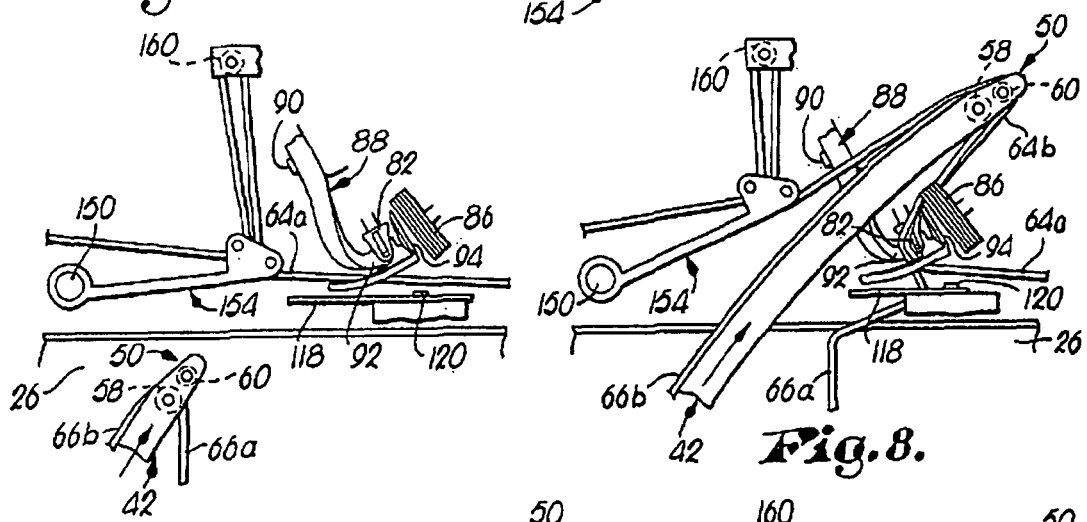
Fig. 7.
Fig. 8.
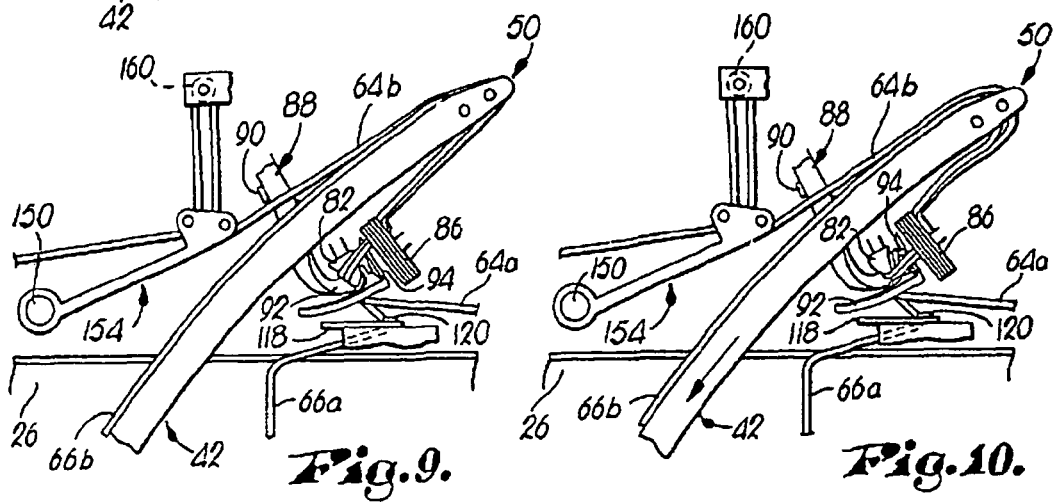
Fig. 9.
Fig. 10.

KNOTTER FOR A BALER

This invention relates to a knotter for binding bales of harvested crop material or other substances so that the bales may be handled, stored or otherwise manipulated without breaking apart.

BACKGROUND OF THE INVENTION

Bales are often prepared under conditions of substantial pressure so that the finished product is considerably more dense than the loose material from which it is made.

While it may generally be stated that increased density in such bales is a highly desirable objective, obtaining that goal has in many respects been thwarted because of the limitations of conventional wire and twine tying mechanisms. Beyond a certain level of tension in the wire or twine strands, the mechanisms experience difficulty in holding on to the strands and manipulating the same through the various motions involved in tying the opposite ends of the strands into a satisfactory knot or other type of connection. Moreover, the strands themselves can only withstand certain levels of tension before they will break.

In balers that make a single knot in each loop of twine encircling a bale, one area in which substantial tension is created in the strands stems from the procedure of pulling the strands between the tightly abutting ends of a previous bale and the one being formed in order to progressively lengthen the material in the loop until the forming bale reaches its predetermined size, at which point the opposite ends of the loop are simply tied together and the bale is thereby securely bound. The need to pull the strands between the abutting bales in this manner arises because each strand has one end thereof retained by the tying mechanism while the rest of the strand is draped across the bale chamber. As the growing bale is pushed through the chamber, it presses against the strand draped across the chamber and, because one end is anchored at the tier, the strand must be pulled between the bales by the tier in order to increase the length of the strand along that side of the bale adjacent the tier. While the tension may be relatively low in the strand along its length between the source of supply and the bales, the tension will necessarily be quite higher along that length from the bales to the tier. It is along this latter length that troubles arise.

To overcome this problem, baling machines have been proposed in which each loop comprises two knots. Two runs of twine drawn from two separate supply rolls are knotted at the commencement of formation of a bale. As the size of the bale increases, more twine is drawn from the supply rolls but neither run of twine needs to slide over the surface of the bale and the formed knot remains in the same place on the bale as it increases in size. At the end of a bale forming cycle, two knots are formed in the two twines, the first to tie the completed bale and the next to commence the next bale.

A baler employing such a knotting system is disclosed in U.S. Pat. No. 4,142,746 the drawings and description of which are reproduced below as background to the present invention, which is concerned with an improvement in one of the components of the knotter used in the baler of that patent.

As will become apparent from the detailed description of U.S. Pat. No. 4,142,746 which follows, the knotter comprises a twine holder which tightly grips the two runs of twine to be knotted for the entire duration of the process of tying the two desired knots. A device known as a bill hook rotates in front of the twine holder to form the knots and a cutter separates each knot as it is formed from the twine runs gripped by the holder. A twine finger arranged below the bill hook is pivoted to bring the runs of twine within the reach of the bill hook at the commencement of formation of each of the two knots.

During the formation of the first of the two knots, that is to say the knot used to complete a loop wrapped around a bale, the twine is kept in tension by the compressed bale and this results in a tight knot with long tails projecting from the knot. Such a knot has no tendency to come undone during handling of the bale. During the formation of the second knot, on the other hand, the runs of twine still gripped by the holder are only under the tension of the runs of twine drawn from the supply rolls. These runs may have a spring arm for taking up slack and a friction device to resist unraveling of the rolls but the tension cannot be set too high on account of the noise and wear that the high tension would cause during the formation of the bales. As a consequence, the second knot is currently not as tight as the first and has shorter tails protruding from it. Because of this, the second knot, i.e. the knot tying the twine runs to each other prior to formation of a new bale, risks become unfastened while the bales are being handled.

SUMMARY OF THE INVENTION

According to the present invention, there is provided a knotter comprising a twine holder, a bill hook, an arm carrying a crotch and a cutter and a twine finger operated by a drive mechanism to form two knots consecutively, the first to tie together two runs of twine passed around a completed bale and the second to tie together two runs of twine drawn from respective supply rolls for the commencement of the next bale, wherein the twine holder serves to grip the two runs of twine drawn from the supply rolls throughout the formation of the two knots, the bill hook serves to knot the runs of twine gripped by the holder, the cutter serves to sever the runs of twine between the holder and the bill hook, the crotch pushes the twine runs off the bill hook during the completion of each knot and the twine finger is pivotably mounted on the opposite side of the bill hook from the twine holder to bring the sections of the runs of twine to be knotted within the reach of the bill hook, characterised in that an edge of the twine finger contacting the runs of twine as the knots are pushed off the bill hook by the crotch comprises an obstruction to resist movement of the runs of twine in a direction transverse to their length.

The obstruction may be a rounded projection on the edge of the twine finger, which preferably meets the edge from which it projects at a sharp corner.

Preferably, the side of the projection that makes contact with the runs of twine extends substantially at right angles to the edge of the twine finger.

As the bill hook rotates to complete the formation of the second knot, the two runs of twine slide along the edge of the twine finger. By providing an obstruction along this edge to resist movement of the twines, the section of the twine runs that includes the second knot to be under higher tension than the section drawn from the supply rolls and in this way achieves a superior knot without increasing the force needed to draw twine from the two supply rolls.

This may produce a tight second knot with long tails without a large increase in the force needed to draw twine from the supply rolls.

BRIEF DESCRIPTION OF THE DRAWINGS

The invention will now be described further, by way of example, with reference to the accompanying drawings, in which:

FIG. 1 is a fragmentary, elevational view of a baler utilizing a tying apparatus;

FIG. 2 is a diagrammatic view of a complete and a partial double-knotted loop;

FIG. 3 is an enlarged, fragmentary, elevational view of the tier, needle and associated mechanisms in mid-cycle;

FIG. 4 is a fragmentary, plan view thereof taken substantially along line 4-4 of FIG. 3;

FIG. 5 is a fragmentary, front perspective view of the tier with strands draped across the bill hook and held by the retaining discs in readiness to prepare a knot;

FIG. 6 is a fragmentary, elevational view of cams on the drive shaft of the tier for operating the slack take-up arm and the twine finger which assist during the tying operation;

FIGS. 7-16 are fragmentary, schematic views which illustrate the steps in the double-knotting operation; and FIG. 17 is an enlarged, front elevational view of the tip of the needle which presents the strands to the tier, illustrating details of construction thereof.

DETAILED DESCRIPTION OF THE PREFERRED EMBODIMENT

Figure 11:
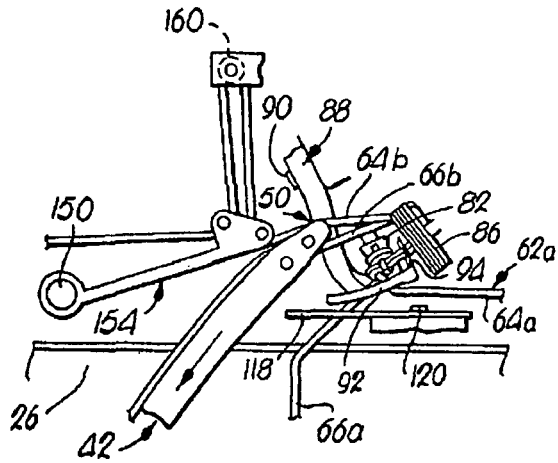

In the description which follows and in certain passages already set forth, the principles of the present invention will be described in terms of "twine" and "knots" formed in such twine. However, it is to be recognized that such principles extend to wire and twisted junctions of wire as well as twine and knots. The claims should be interpreted accordingly.

The baler 20 illustrated in FIG. 1 has a rectangular bale case 22 that happens to be supported for over-the-ground travel by one or more ground wheels 24. The bale case 22 defines a bale chamber 26 that happens to be loaded through a curved duct 28 approaching the case 22 from the bottom thereof. A plunger 30 reciprocates within the bale case 22 to intermittently pack fresh charges of material from the duct 28 rearwardly in the chamber 26 in the direction of the arrow 32. When the bale reaches a predetermined size, a trigger 34 is pulled by a rod 36 connected to a suitable bale length sensor (not shown) to engage a dog clutch 38. This connects a tier 40 and its needle 42 to a source of driving power from the drive chain 44 associated with the clutch 38 whereby to initiate the tying operation.

The needle 42 is mounted on the bale case 22 by a pivot 46 and is swung back and forth across the bale chamber 26 by linkage 48 which becomes activated by the clutch 38. The needle 42 has an "at-home" or rest position fully below the bale case 22 as illustrated in FIG. 1 and a "full-throw" position extended completely across the bale case 22 as illustrated, for example, in FIG. 8. As illustrated perhaps most clearly in FIGS. 3 and 17, the tip 50 of needle 42 has an eyelet 52 defined therein by the opposed furcations 54 and 56 of the bifurcated tip 50 in conjunction with a pair of longitudinally spaced, transversely extending rollers 58 and 60. It will be noted that the roller 58 is positioned inwardly from the outer extremity of the tip 50, while the roller 60 is positioned outwardly from the roller 58 more closely adjacent such extremity. Even so, the roller 60 is positioned a short distance inwardly from the outer extremity of the tip 50, and both of the rollers 58 and 60 may be tapered toward their mid points so as to provide secure seats for the tying strands as will later become apparent.

As will also become apparent, while the structures 58 and 60 have been illustrated in the nature of rollers, they may in fact take the form of stationary transverse structures such as cross pins.

It is suggested at this point that reference be made to FIG. 2 which shows the nature of the binding loop that is involved in the present invention. By reference now to this illustration, it is felt that the details of construction hereinafter described, and the operation hereinafter explained will become more easily understood.

To this end, it is to be noted that the finished product is in the nature of a complete loop 62 that will completely circumscribe the finished bale. The loop 62 is made from two strands of binding material, i.e., one strand 64 along the normally top side of the bale and a second strand 66 along the normally bottom of the bale and its two opposite ends. The strands 64 and 66 thus fully circumscribe the bale and are circumferential complements of one another. Two knots 68 and 70 appear in the loop 62 at those locations where the strands 64 and 66 are substantially end-to-end.

To the left of the loop 62 is a partial loop 62a which is in the process of being formed. Note that the top strand 64a emanates from a source of supply 72, while the bottom strand 66a emanates from an entirely separate, second source of supply 74. At the particular point in the sequence chosen for illustration, the knot 68a is in existence, and the bale is approaching that length where the needle 42 is ready to swing into operation and present the strands 64a and 66a to the tier 40 to complete the second knot 70a (not shown).

With this short explanation in mind, the details of construction as illustrated primarily in FIGS. 3, 4, 5, and 6 may now be described. The tier 40 is identical in many respects to a "Deering" type knotter available from P. D. Rasspe Sohne, Hamburg, West Germany. That is to say, the components of the tier 40 which cooperate to form each of the knots of a bale may be identical to those in a unit provided by the Rasspe Company. However, the means for operating such components to produce a double knot must be different. In the illustrated embodiment, these means include a generally circular element 76 that is secured to a drive shaft 78 for rotation with the latter through one full revolution when the clutch 38 is engaged. The shaft 78 is supported by a forwardly inclined frame 80 attached to the top of the bale case 22, and the frame 80 also supports the above-mentioned components for forming the knots in response to rotation of the element 76.

Briefly, such components include a rotary bill hook member 82 supported by the frame 80 for rotation about an inclined axis 84, a multi-disc holder 86 rearwardly adjacent the bill hook 82 for holding strands 64a and 66a in position for engagement by the bill hook 82 during rotation of the latter, and means for releasing the connected strands from the holder 86 in the form of an arm 88 pivoted to the frame 80 by a bolt 90. The lower end of the arm 88 is forked, defining a crotch 92 that opens away from the holder 86 beneath the bill hook 82. The crotch 92 carries a cutter 94 between the bill hook 82 and the holder 86 for severing the strands 64a, 66a in response to swinging movement of the arm 88 in the proper direction. Such movement of the arm 88 to operate the cutter 94 also serves to engage the proximal areas of the crotch 92 with a knot formed on the bill hook 82 for stripping such knot off of the bill hook 82.

In order to transmit driving power from the element 76 to the bill hook 82, the latter is provided with a gear 96 which is disposed for meshing engagement with a pair of circumferentially spaced gear stretches 98 and 100 on the element 76. Similarly, driving power is transmitted to the discs of the holder 86 through a worm gear drive 102 and a bevel gear 104 in position for sequential meshing engagement with a pair of circumferentially spaced gear sections 106 and 108 on the element 76. Power to swing the arm 88 about the pivot bolt 90 is obtained through a cam follower 110 at the upper end of the arm 88 beyond the pivot bolt 90 which is disposed within a cam track 112 on the element 76. A pair of circumferentially spaced cam shoulders 114 and 116 in the track 112 are positioned to sequentially engage the follower 110 to operate the latter.

A finger 118 is located below the bill hook 82 and the crotch 92 of the tier 40 and is mounted on an upright pivot 120 for lateral swinging movement between a standby position illustrated in FIGS. 3 and 4 and a full-throw, laterally extended position somewhat beyond that illustrated in FIG. 5. An operating link 122 attached at one end to the finger 118 and at the opposite end to a crank 124 serves to effect swinging of the finger 118. The crank 124 is in turn fixed to a transversely extending shaft 126 that extends to a point behind the element 76 where it carries a second crank 128 as illustrated in FIG. 6. The crank 128 is biased upwardly in a counter clockwise direction by a coil spring 130 and carries a cam follower 132 at its outermost end. The follower 132 is in position for operating engagement with a double-lobed cam 134 fixed to the shaft 78 for rotation therewith, the lobes 135 and 138 being circumferentially spaced apart in accordance with the desired timed relationship between the finger 118 and the knot-forming components of the tier 40.

Also mounted on the shaft 78 with the cam 134 is a second cam 140 having a peripheral land stretch 142 over approximately 180 degrees of its circumference and a peripheral valley stretch 144 over the remaining approximately 180 DEG of its circumference. Such stretches 142 and 144 are disposed for operating engagement against a cam roller 146 located at the outer end of a lever 148 that is fixed at its inner end to a transverse shaft 150. The lever 148, and hence the shaft 150, is resiliently biased in a counter clockwise direction viewing FIG. 6 by a coil spring 152, and the shaft 150 extends back out to the opposite side of the element 76 in parallelism with the shafts 78 and 126 to a point substantially in fore-and-aft alignment with the bill hook 82.

At that location, the shaft 150 fixedly carries a rearwardly extending slack take-up device 154. The device 154 carries a pair of spaced rollers 156 and 158 at its rearmost end around which the strand 64a is entrained as illustrated in FIG. 3. A length of the strand 65a is also looped upwardly around another roller 160 disposed above the device 154 and carried by the tier frame 80 adjacent the drive shaft 78.

Noteworthy also at this point is the fact that the strand 64a may be frictionally clamped between a pair of opposed plates 162 and 164 (FIG. 3) of a tensioning unit 166. The force with which the plates 162 and 164 clamp the strand 64a may be controlled by a wing nut 168 operating against a spring 170 that in turn presses against the shiftable plate 164. A tensioning unit similar to unit 166 may also be provided for the strand 66a, although such additional unit is not illustrated.

Operation

The condition of the partial loop 62a in FIG. 2, and that of the tier 40 and the needle 42, corresponds substantially with conditions illustrated in FIGS. 3, 4 and 7, with the exception that in FIG. 2, the needle 42 is still in its home position. At this time, the bale has reached its desired length and it is time to complete the loop around the bale and make the second knot in the loop. Note that the strand 64a stretches along the top of the bale directly beneath the crotch 92 of the arm 88 but, at least for all effective purposes, is out of contact with the tier 40.

As illustrated in FIG. 7, as the needle 42 swings upwardly toward the tier 40, it carries with it the strand 66a as the latter is paid out by source 74. Note also that because the strand 66a is threaded through the eyelet 52 of needle 42, a length of that strand on the twine source side of the needle 42 is also carried upwardly toward the tier 40, such extra length being hereinafter denoted 66b.

During the time that the needle 42 approaches the tier 40, no additional length of the strand 64a is pulled from the source 72. Even as the tip of the needle 42, and more particularly the roller 60, snares the strand 64a as illustrated in FIG. 8 and presents strands 64a and 66a in unison to the tier 40, still no additional length of the strand 64a is pulled from source 72 because the device 154 rocks upwardly in a counter clockwise direction to provide the slack necessary in the strand 64a to accommodate the needle movement. In presenting the strands 64a and 66a, the needle 42 actually drapes the strands across the bill hook 82 and thence into awaiting notches of the holder 86, whereupon rotation of cooperating discs in the latter serve to firmly grip the strands and prevent their escape as the bill hook 82 begins its rotation as illustrated in FIG. 9. Note that during the time that the strands are being delivered across the bill hook 82 to the holder 86, the finger 118 is actuated to swing inwardly and engage at least the strand 66a as illustrated in FIGS. 8 and 9 for the purpose of seating the same deeply within the crotch 92 so as to assure that the strands 64a and 66a are both in proper position across the bill hook 82.

Figure 12:
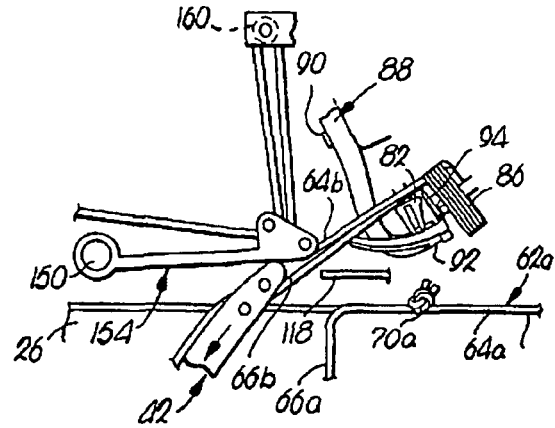

The foregoing movements on the part of the bill hook 82 and the holder 86 are, of course, brought about by operable interengagement of the gear stretch 98 and gear section 106 on the element 76 with their respective gears 96 and 104 on the bill hook 82 and the holder 86. Such driving interengagement continues until a knot has been formed on the bill hook 82 as illustrated in FIGS. 10 and 11, by which time the needle 42 has begun to withdraw. At this point, the cam shoulder 114 of the element 76 comes into engagement with the roller 110 of the arm 88 so as to swing the bottom of the latter, and hence the cutter 94, across that portion of the strands between the bill hook 82 and the holder 86, thereby severing the same as illustrated in FIG. 11. Such motion of the arm 88 also strips the finished knot 70a from the bill hook 82 and drops the completed loop on the bale as illustrated in FIG. 12.

Figure 13:
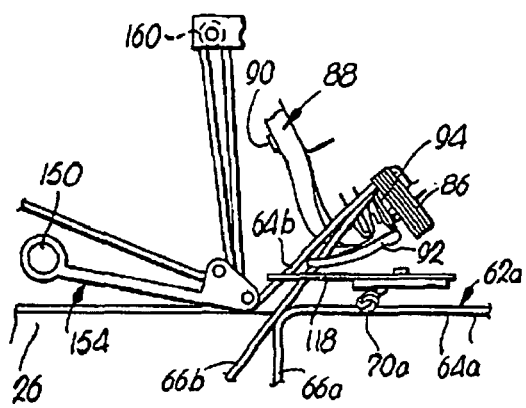
Figure 14:
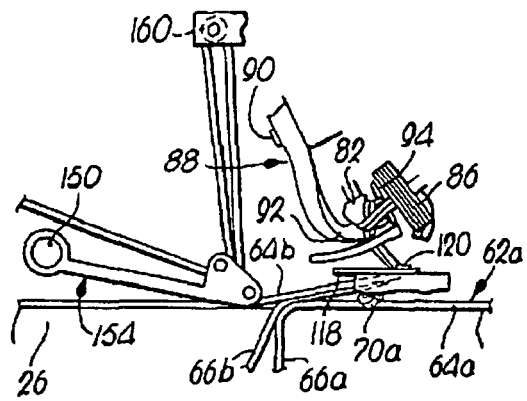
Figure 15:
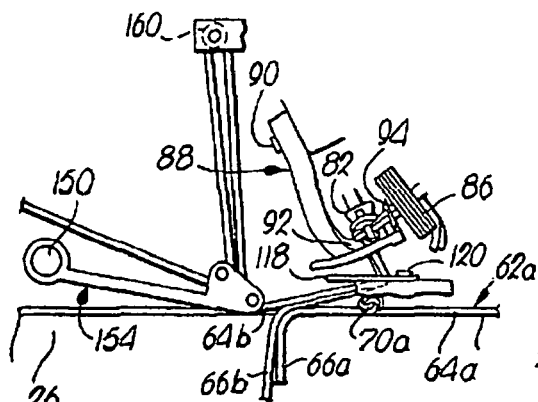

While the knot 70a is dropped by the tier 40 following severance and stripping from the bill hook 82, the strand 66b to source 74, as well as strand 64b to source 72, is retained by the holder 86. Consequently, as the needle 42 continues to retract, the strand 66b is draped downwardly across the bale chamber 26 while the slack take-up device 154 lowers to its normal position to pull a small amount of additional material from the source 72. Upon reaching the condition illustrated in FIG. 13, the strands 64b and 66b are in position for institution of the second tying cycle which is started by the finger 118 (which has been previously returned to its standby position) swinging inwardly to engage the strands 64b and 66b and seat them deeply within the crotch 92 as shown in FIG. 14. This assures that the strands 64b and 66b are properly positioned across and in engagement with the bill hook 82, whereupon the latter and the holder 86 are operated by their second respective gear stretch 100 and gear section 108 on the element 76. Thus, the knot becomes formed as illustrated in FIG. 15, whereupon the arm 88 is once again actuated, but this time by the second cam shoulder 116, to sever the knot from the holder 86 and to strip the same from the bill hook 82. This becomes knot 68b in FIG. 16, and it will be recognized that such joinder of the strands 64b and 66a is the start of a new loop which, although not illustrated, would be numbered 62b. Such new loop, at its inception, takes the form of an open-ended bight along the lines of, but much shorter than, the partial loop 62a in FIG. 2. Such bight is in position to receive new material that is packed into the bale chamber 26 by the plunger 30, and the bight grows in length as additional lengths of the strands 64b and 66b are simultaneously pulled from their sources 72 and 74. Finally, when the bale has reached its desired size, the sequence returns to its starting point, whereupon the bight is closed by operation of the needle 42 to complete the loop around the bale and from the second knot.

Figure 16:
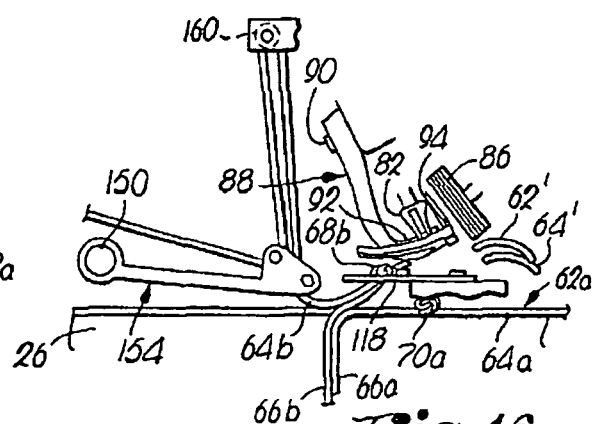

As illustrated in FIG. 2, and as also shown in FIG. 16, two short segments 62' and 64' are released by the holder 86 following completion of the tying sequence and in preparation for start of the next sequence. Such segments are left as a result of the surplus strands that are contained within the discs of the holder 86 following the two cutting strokes of the cutter 94.

It should be apparent from the foregoing that two complete tying cycles are carried out during each single revolution of the drive shaft 78. Thus, each time the needle 42 swings into operation, two knots are formed by the tier 40. One knot is the second knot 70 on the preceding bale, and the other is the first knot 68 on the next succeeding bale. The cutter 94 operates to sever the two knots from one another, thereby also disconnecting the two bales from each other.

Of considerable importance is the fact that once the strand 66 is drawn across the bale chamber 26 by the withdrawing needle 42 and the knot 68 is formed, the strands 64 and 66 remain substantially stationary relative to the forming bale throughout the remainder of the bale-forming and knot-tying processes. The additional lengths of binding material required to accommodate growth of the forming bale are readily obtained from the two separate sources of supply 72 and 74, the resistance to such strand pulling being only that exerted by the sources 72, 74 themselves and by any tensioning control units that may be utilized such as the unit 166 in FIG. 3. There is no need to pull either strand through the interface formed between the tightly abutting preceding bale and the one being formed, and thus the strands, as well as the tier 40, avoid the application of excessive tension and stresses.

The description of the knotter as set out above is similar to U.S. Pat. No. 4,142,746 and the drawings are all essentially the same, save for a modification to the shape of the twine finger 118, shown in FIG. 4. A full description of the operation has been given so that the reader not already familiar with the construction and operation of a double knotter may appreciated the function of the twine finger, the shape of which is modified in the present invention in order to improve the quality of the second knot, as produced in the steps shown in FIGS. 13 to 16 of the accompanying drawings.

In the present invention, the edge 118a of the twine finger in contact with the runs of twine 64b, 66b as the second knot is being pushed off the bill hook 82 by the crotch 92 has a bump 118b which obstructs the runs of twine as they attempt to slide along the edge 118a under the action of the crotch 92. The side of the bump 118b which contacts the twine runs is at right angles to the edge 118a. The corner between the bump 118b and the edge 118a catches on the twine runs but does not risk cutting into them. As a result of the obstruction 118b, as the crotch 92 is pivoted about the axis 90 to release the knot from the bill hook 82 at the same time as the free ends of the twine are pulled by the bill hook 82 through the loop of twine wrapped around it, the tension in the section of the twine runs between the finger 118 and the bill hook 82 is increased, thus tightening the knot and lengthening the tails protruding from the knot. This increase in tension is achieved without any increase in the tension in the sections of the twine runs drawn from the supply rolls.

We claim:

1. A knotter comprising:
   a twine holder, a bill hook, an arm carrying a crotch and a cutter and a twine finger operated by a drive mechanism configured to form two knots consecutively, the first to tie together two runs of twine passed around a completed bale and the second to tie together two runs of twine drawn from respective supply rolls for the commencement of the next bale; the twine holder serving to grip the two runs of twine drawn from the supply rolls throughout the formation of the two knots, the bill hook serving to knot the runs of twine gripped by the holder, the cutter serving to sever the runs of twine between the holder and the bill hook, the crotch configured to push twine running off the bill hook during the completion of each knot; and
   the twine finger is pivotably mounted on the opposite side of the bill hook from the twine holder and configured to bring the sections of the runs of twine to be knotted within the reach of the bill hook, an edge of the twine finger, configured to contact the runs of twine as the knots are pushed off the bill hook by the crotch, comprises an obstruction configured to resist movement of the runs of twine in a direction transverse to their length.

2. A knotter as claimed in claim 1, wherein obstruction is a rounded projection on the edge of the twine finger.

3. A knotter as claimed in claim 2, wherein the projection meets the edge from which it projects at a sharp corner.

4. A knotter as claimed in claim 1, wherein the side of the projection configured for contacting the runs of twine extends substantially at right angles to the edge of the twine finger.

* * * * *